United States Patent
Nikitin et al.

(10) Patent No.: US 11,151,336 B2
(45) Date of Patent: Oct. 19, 2021

(54) SYSTEMS AND METHODS FOR A RECONFIGURABLE RADIO FRONT-END

(71) Applicant: INTERMEC, INC., Lynnwood, WA (US)

(72) Inventors: Pavel Nikitin, Seattle, WA (US); Stephen J. Kelly, Marion, IA (US); Antony Baskar Arul, Chennai (IN)

(73) Assignee: INTERMEC, INC., Lynnwood, WA (US)

( * ) Notice: Subject to any disclaimer, the term of this patent is extended or adjusted under 35 U.S.C. 154(b) by 245 days.

(21) Appl. No.: 15/644,016

(22) Filed: Jul. 7, 2017

(65) Prior Publication Data

US 2019/0012493 A1    Jan. 10, 2019

(51) Int. Cl.
*G06K 7/00* (2006.01)
*H04B 1/00* (2006.01)
(Continued)

(52) U.S. Cl.
CPC ....... *G06K 7/0004* (2013.01); *G06K 7/10386* (2013.01); *G06K 7/10881* (2013.01);
(Continued)

(58) Field of Classification Search
CPC ............. G06K 7/0008; G06K 19/0723; G06K 19/0724; G06K 19/07767; G06K 19/07773; G06K 7/0095; G06K 7/10237; G06K 7/10316; G06K 7/10336; G06K 7/10346; G06K 7/10465; H04B 5/0062; H04B 1/0057; H04B 1/0483; H04B 1/18; H04B 1/3805; H04B 1/406; H04B 1/44;
(Continued)

(56) References Cited

U.S. PATENT DOCUMENTS 7,587,224 B2   9/2009   Zolfaghari
8,579,195 B2   11/2013  Tiggelman et al.
(Continued)

OTHER PUBLICATIONS

"IEEE 802.11ah;" Wikipedia: The Free Encyclopedia. Wikimedia Foundation, Inc.; retreived from: https://en.wikipedia.org/wiki/IEEE_802.11ah; 2017.
(Continued)

*Primary Examiner* — Golam Sorowar
(74) *Attorney, Agent, or Firm* — Alston & Bird LLP

(57) ABSTRACT

Systems and methods for a reconfigurable radio front-end are provided. One system includes a device having an antenna, a first front-end communication section configured to communicate using a first communication method and a second front-end communication section configured to communicate using a second communication method, wherein the first and second communication methods are different communication methods. The device further includes a switch having an input configured to receive a control signal via a communication line to select the first front-end communication section or the second front-end communication section and a controller configured to control a state of the switch. The switch is configured to be switched between states when the controller receives the control signal, thereby allowing communication using the first communication method or the second communication method via the antenna.

19 Claims, 3 Drawing Sheets

(51) Int. Cl.
*H04B 1/401* (2015.01)
*G06K 7/10* (2006.01)
*G06Q 20/20* (2012.01)
*G07G 1/00* (2006.01)
*H04B 1/48* (2006.01)
*H04B 1/58* (2006.01)

(52) U.S. Cl.
CPC ......... *G06Q 20/203* (2013.01); *G07G 1/0081* (2013.01); *H04B 1/006* (2013.01); *H04B 1/0067* (2013.01); *H04B 1/401* (2013.01); *B65C 2210/0008* (2013.01); *G06K 7/10009* (2013.01); *H04B 1/48* (2013.01); *H04B 1/58* (2013.01)

(58) Field of Classification Search
CPC ...... H04B 5/00; H04B 5/0012; H04B 5/0037; H04B 5/0075
See application file for complete search history.

(56) References Cited

U.S. PATENT DOCUMENTS

| | | | |
|---|---|---|---|
| 8,644,197 | B2 | 2/2014 | Lee et al. |
| 8,909,169 | B2 | 12/2014 | Kok |
| 2005/0245201 | A1 | 11/2005 | Ella et al. |
| 2006/0238306 | A1* | 10/2006 | Loving ................ G06K 7/0008 340/10.1 |
| 2007/0092045 | A1* | 4/2007 | Woo ...................... H04B 1/406 375/343 |
| 2007/0205865 | A1* | 9/2007 | Rofougaran ............ H04W 4/18 340/10.1 |
| 2009/0209283 | A1* | 8/2009 | Yang .................... H04B 1/0057 455/553.1 |
| 2009/0303007 | A1* | 12/2009 | Ryou ................... H04B 5/0062 340/10.1 |
| 2010/0137024 | A1 | 6/2010 | Maguire |
| 2010/0176927 | A1* | 7/2010 | Partanen .............. G06K 7/0008 340/10.3 |
| 2014/0218177 | A1* | 8/2014 | Zhao ...................... H04B 1/18 340/10.5 |
| 2014/0353368 | A1* | 12/2014 | Connolly .......... H04W 52/0229 235/375 |
| 2016/0261976 | A1* | 9/2016 | Butler .................. H04B 5/0012 |

OTHER PUBLICATIONS

"Wi-Fi HaLow;" Wi-Fi Alliance; retreived from http://www.wi-fi.org/discover-wi-fi/wi-fi-halow; 2017.

Park; "IEEE 802.11ah: Sub-1-GHz License-Exempt Operation for the Internet of Things;" IEEE Communications Magazine; 2015; vol. 53; No. 9; 7 pp.

Nov. 14, 2018 Search Report issued in European Patent Application No. 18182023.4.

Communication Pursuant to Article 94(3) issued in European Application No. 18182023.4 dated Feb. 25, 2021, 11 pages.

* cited by examiner

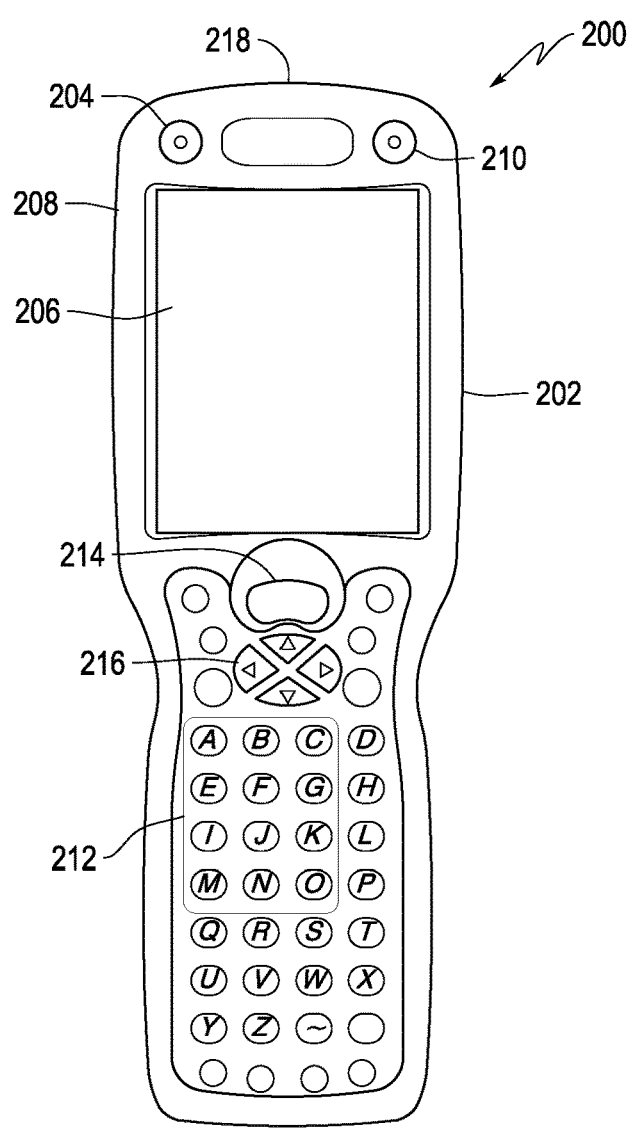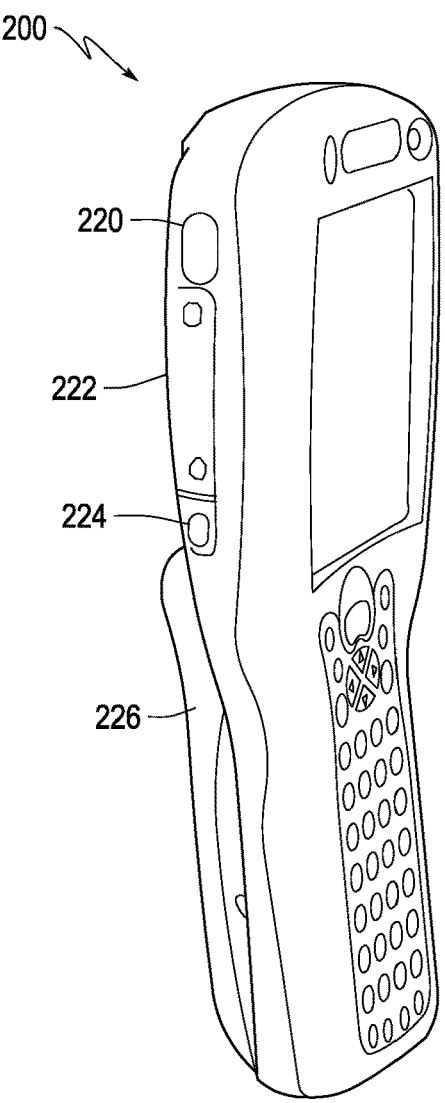
FIG. 2A　　　　　　　　　　FIG. 2B
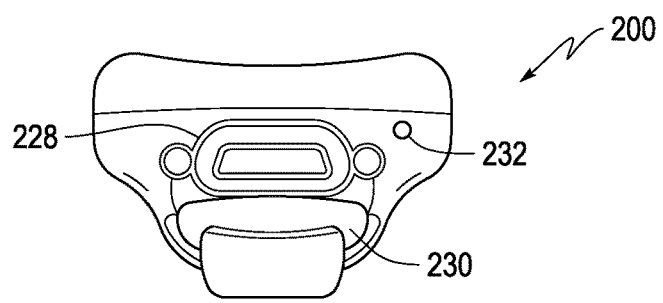
FIG. 2C

SYSTEMS AND METHODS FOR A RECONFIGURABLE RADIO FRONT-END

BACKGROUND

Conventional radio devices include a non-configurable front-end. In particular, these devices have a fixed front-end topology to operate at a specific frequency band. For example, 802.11 abgn radios, operating at 2.4 GHz and 5.8 GHz bands have time multiplexing performed using a transmit/receive (Tx/Rx) switch, while UHF RFID radios operating at the 915 MHz band (and other ISM UHF bands) have a radar-like front end where transmission and reception are performed simultaneously at the same frequency. In these conventional devices, UHF RFID (869/915 MHz bands) and WiFi (2.4/5.8 GHz abnd) standards require two very different radio front-end architectures that are very difficult to integrate together in a handheld device, including requiring different Tx/Rx chipsets, different RF front ends, and different antennas.

SUMMARY

To overcome these and other challenges, aspects of broad inventive principles are disclosed herein.

In one embodiment, a device is provided that includes an antenna, a first front-end communication section configured to communicate using a first communication method and a second front-end communication section configured to communicate using a second communication method, wherein the first and second communication methods are different communication methods. The device further includes a switch having an input configured to receive a control signal via a communication line to select the first front-end communication section or the second front-end communication section and a controller configured to control a state of the switch. The switch is configured to be switched between states when the controller receives the control signal, thereby allowing communication using the first communication method or the second communication method via the antenna.

In another embodiment, a radio is provided that includes an antenna and a single transmit and receive communication chipset configured to operate for WiFi communication and radio-frequency identification (RFID) communication. The single transmit and receive communication chipset is switchable between the WiFi communication and RFID communication to communicate using the antenna.

In another embodiment, a method is provided that includes sending a control signal to a reconfigurable front-end of a radio via a communication line and switching a state of the reconfigurable front-end to change between communication methods used to transmit and receive signals, wherein the communication methods includes WiFi communication and radio-frequency identification (RFID) communication. The method further includes sending a signal to be transmitted via a common antenna used for the WiFi communication and radio-frequency identification (RFID) communication.

BRIEF DESCRIPTION OF THE DRAWINGS

FIGS. 2A, 2B and 2C schematically illustrate an RFID apparatus according to one embodiment.

DETAILED DESCRIPTION

Figure 1:
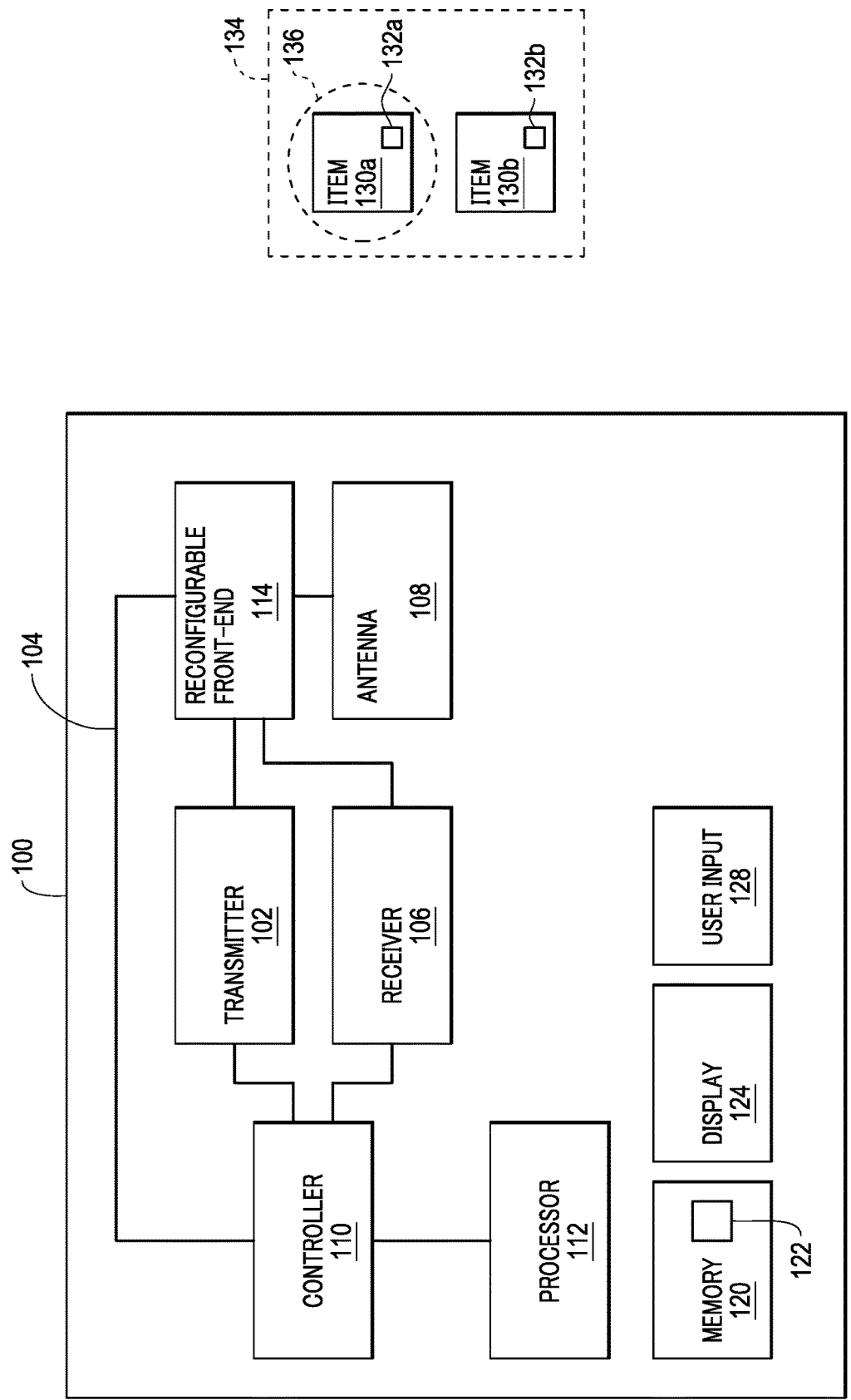
FIG. 1 is a block diagram illustrating a system according to one embodiment.

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Like numerals represent like parts in the Figures.

Various embodiments include systems and methods for a reconfigurable radio front-end, such as a reconfigurable front-end for a portable communication device or a radio-frequency identification (RFID) reader. More particularly, in some embodiments, the front-end is configured to operate in the WiFi standard, 802.11 ah, that will operate in the same unlicensed sub-1 GHz band, where all UHF RFID systems already operate (e.g. 869 MHz band in Europe, 915 MHz band in the US, etc.). In various embodiments, a transmitter and receiver hardware (chipset) for 802.11ah is configured to generate and receive UHF RFID signals as well (AM modulated reader-to-tag and IQ reception and decoding of BPSK modulated signals from tag). For example, in various embodiments, a reconfigurable topology front-end allows WiFi 802.11ah (915 MHz) and UHF RFID (915 MHz) systems to share a same common radio (Tx/Rx chipset) and a same common antenna. Thus, in some embodiments, the transmitter and receiver hardware (Chipset) for 802.11ah is made capable of generating and receiving UHF RFID signals (e.g., AM modulated reader-to-tag IQ reception and decoding of BPSK modulated signals from an RFID tag).

In various embodiments, the reconfigurable front-end can be driven by a radio (e.g., RFID reader with a radio transceiver) and communicate in different frequency bands using a common antenna. It should be understood that while the reconfigurable front-end may be described in connection with handheld or portable computing devices for a particular application, the reconfigurable front-end may be used with different devices, and in many different applications. It should be noted that the reconfigurable front-end and various components are referred to herein for ease of illustration. However, it should be understood that the system and various components may be configured as a reconfigurable front-end for any type of radio transceiver system, which may include an RFID scanning system.

In one embodiment, a system 100 (e.g., a radio) with a reconfigurable front-end according to various embodiments may be implemented as shown in FIG. 1. The system 100 may be embodied as or form part of a handheld RFID scanner. For example, the system 100 may be embodied or form part of a mobile computing device, such as an Intermec mobile computer available from Honeywell Scanning and Mobility.

The system 100 may comprise a transmitter 102 and a receiver 106, both connected to an antenna 108 (e.g., a single common antenna) via a reconfigurable front-end 114. The transmitter 102 and receiver 106 (and associated components) may be provided, for example, within a housing of the system (e.g., within a housing of an RFID reader). The reconfigurable front-end 114 allows for communication in different frequency bands as described herein.

It should be noted that the antenna 108 may include various antenna elements and/or may take different configurations as would be used in antenna technology, such a particular to RFID antenna technology or WiFi antenna technology, or both. For example, the antenna elements may be arranged or aligned to form different sized and shaped arrays as desired or needed, such as based on RFID tags to be scanned or other communications to be performed, such as communicating WiFi data.

The transmitter 102 and receiver 106 are coupled through the reconfigurable front-end 114 to the antenna 108 to provide transmission and reception selectively at different operating frequency bands. For example, transmission and reception may be provided for WiFi or RFID communications. When providing RFID communication (e.g., transmitting and receiving RFID signals using the antenna 108), the system 100 is operable to scan a region of interest 134 to acquire RFID tag information. Thus, the antenna 108 in this configuration is operable to provide RFID communication. In other embodiments, as described herein, other types of communication may be provided by switching the front-end communication configuration of the system 100 using the reconfigurable front-end 114, such as to perform WiFi communication, such as to communicate acquired RFID information through a network. In some embodiments, when operating using a WiFi communication front-end, RFID over WiFi communication may be provided.

In the illustrated embodiment of FIG. 1, the system 100 may also comprise a controller 110 coupled to the transmitter 102 and receiver 106 to generate signals, such as both RFID read signals and control signals for use in RFID communications or WiFi control or data signals for use in WiFi communications, which may be communicated via control line 104. For example, the control line 104 (which may be one or more transmission lines) transmit switch control signals to one or more components of the reconfigurable front-end 114. It should be noted that any type of communicative or operative coupling may be used, such as any type of wireless or wired communication.

The controller 110 is also coupled to the reconfigurable front-end 114. The controller 110 is configured to select a particular front-end communication configuration by selectively activating one of a plurality of front-end communication configurations as discussed in more detail herein, and/or to control one or more components during communication.

Thus, the controller 110 is configured to control the operation of the transmitter 102 and receiver 106, such as to control the transmissions and the reception by the antenna 108, as well as the configuration of front-end by controlling the selection of the front-end topology of the reconfigurable front-end 114. In one embodiment, the controller 110 is a transmit and receive controller configured to control signals, such as the radio-frequency (RF) pulses sent to the antenna 108 the communication of signals received by the antenna 108, as well as control signals sent to the reconfigurable front-end 114 to change the front-end configuration of the reconfigurable front-end 114, which changes the front-end communication configuration of the system 100.

The system 100 may further comprise a processor 112 coupled to the controller 110. As described in more detail herein, the processor 112 can control the operation of the controller 110 to transmit and receive as desired or needed, including to change the front-end configuration of the system 100, which may be dynamically reconfigured by selecting a front-end communication topology of the reconfigurable front-end 114.

In an RFID communication mode, the processor 112 is also configured in various embodiments to process received signal information to determine the location and/or acquire information for one or more RFID tags 132a, 132b coupled to items 130a, 130b. For example, the region of interest 134 may be a portion of a storage facility having a large number of RFID tagged objects or items and the RFID tag 132 may be affixed directly to the item 130 or a packaging of the item using techniques in the art. The processor 114, in this RFID communication mode of operation, is configured to receive tag response and/or read information using the antenna 108.

As another example, in a WiFi communication mode, the processor 112 is also configured in various embodiments to process received signal information, including WiFi data, such as to decode or demultiplex received WiFi data packets. It should be noted that RFID and WiFi communications are two types of communication that may be provided by selectively controlling the reconfigurable front-end 114. However, other communication methods and protocols may be used based on the configuration of the reconfigurable front-end 114.

A memory 120, which may be any type of electronic storage device, can be coupled to the processor 112 (or form part of the processor 112). The processor 112 may access the memory 120 to obtain stored information 122 such as control information for use in selectively changing the configuration of the reconfigurable front-end 114.

The system 100 may also comprise a display 124 and a user input device 128 coupled to the processor 112 to allow user interaction with the system 100. For example, the display 124 can allow selecting a particular front-end configuration for the reconfigurable front-end 114 based on the type of communication to be performed, such as an RFID scan or WiFi data connection. It should be noted that in some embodiments, the display 124 and user input device 128 may be integrated, such as in a touchscreen display device.

While FIG. 1 illustrates a particular connection arrangement of the various components, a skilled artisan would appreciate the fact that other connection arrangements may be made that are within the scope of this disclosure. Additionally, the various components may be housed within the same or different physical units and the separation of components within FIG. 1 is merely for illustration. The system 100 may also comprise one or more communication subsystems to allow communication with external devices, such as networks, printers, etc. Thus, additional components may form part of or communicate with the system 100.

In some embodiments, the system 100 may be embodied as part of a RFID apparatus 200 is shown in FIG. 2A (front panel view), 2B (oblique panel view) and 2C (bottom panel view). The RFID apparatus 200 (e.g., RFID reader) can comprise a housing 202 within which other components of RFID apparatus 200 can be disposed. An LCD screen display with touch screen sensor 206 can be disposed on a front panel 208. Also disposed on the front panel 208 can be an operation LED 204, a scan LED 210, and keyboard 212 including a scan key 214 and navigation keys 216. An imaging window 218 can be disposed on the top panel of the housing 202. Disposed on the side panel (best viewed in FIG. 2B) can be an infrared communication port 220, an access door to a secure digital (SD) memory interface 222, an audio jack 224, and a hand strap 226. Disposed on the bottom panel (best viewed in FIG. 1C) can be a multi-pin mechanical connector 228 and a hand strap clip 230.

Also disposed on the bottom panel (or alternatively on the top panel) can be an RFID antenna housing and an RFID read device (which may can include the transmitter 102 and receiver 106 shown in FIG. 1) within the housing 202. In the illustrated embodiment, a connection port 232 is provided for connection to an external device.

While FIGS. 1A-1C illustrate one embodiment of a handheld housing, a skilled artisan would appreciate that other types and form factors of terminal housings are within the scope of this disclosure.

Figure 3:
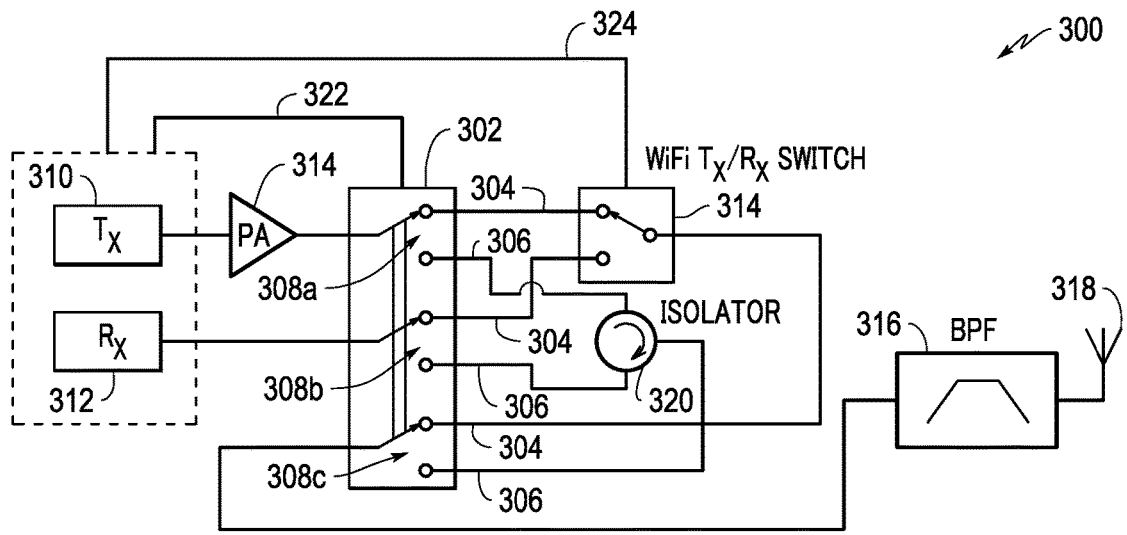
FIG. 3 is a block diagram of a reconfigurable front-end according to one embodiment.

In one embodiment, as illustrated in FIG. 3, a reconfigurable front-end 300 is provided and switchable between front end topologies, which in the illustrated embodiment is between WiFi and RFID communication topologies. The reconfigurable front-end 300 may be configured as, embodied as or form part of the reconfigurable front-end 114. The reconfigurable front-end 300 includes a switch 302 that is configured to switch between the WiFi and RFID communication topologies (also referred to as a WiFi/RFID switch) by switching between a WiFi communication path 304 and an RFID communication path 306 (the different sub-paths for each of these communication paths are identified by reference numerals 304 and 306). For example, by switching between the paths 304 and 306 using the switch 302, communication components corresponding to WiFi communication or RFID communication, respectively, are selected.

In the embodiment illustrated in FIG. 3, the switch 302 is illustrated as switched to a WiFi communication mode of operation, such that transmission and reception is provided through a WiFi front end topology. In the illustrated embodiment, a transmitter 310 and a receiver 312, which may be configured as, embodied as or form part of the transmitter 102 and receiver 106 (both shown in FIG. 1), are connected to an input of the switch 302 via a power amplifier 314. The power amplifier is configured to increase the power level of the signals to the switch 302, which may include WiFi or RFID signals (e.g., an RFID read signal) to be transmitted from the antenna 108 (shown in FIG. 1).

The switch 302 may be any type of switch, such as a semiconductor switch with a digital interface, which may be an RF-type switch. It should be noted that although the switch is shown as a 3 to 6 switch, different configurations of switches (e.g., 1 to 2 or 2 to 4), including multiple switches may be provided. The switch 302 is controlled using switching techniques in the semiconductor or RF switching technology, such as using control signals generated by the controller 110 (shown in FIG. 1). By controlling the switch 302 using the control commands, one or more switching elements 308 (or switching components) are switchable to provide different types of communication by connecting to different front-end topologies. As described herein, in the illustrated embodiment, the switching by the switch 302 selects the WiFi communication or RFID communication. However, it should be appreciated that the switching may be controlled such that the two types of communication are separately provided or simultaneously provided.

In one embodiment, the switch 302 is a pseudomorphic high-electron-mobility transistor (pHEMT) gallium arsenide (GaAs) switch, such as an AS193-73LF RF switch (available from Skyworks). In this embodiment, the controller 110 outputs signals to switch the switch 302 (e.g., the RF switch may be controlled by signals from RFID IC GPIO (general-purpose input/output) pins of the EM4325 Gen 2 IC). However, it should be appreciated that any type of controllable switching element may be used. For example, although the switch 302 is illustrated as a series of single triple pole dual throw (TPDT) switching elements, different switches or switching arrangements may be used. Thus, reconfigurable communication paths may be provided.

In operation, in the illustrated embodiment, the switch 302 is configured to control switching between WiFi and RFID communications, namely between a WiFi front-end section and an RFID front-end section. In the illustrated embodiment, the WiFi front-end section includes a switch 314 configured to operate as a WiFi Tx/Rx switch for a WiFi radio topology front-end section. The switch 314 switches between transmission and reception for the WiFi communication paths 304. It should be noted that the switch may be a multiple-input and multiple-output (MIMO) switch that is controllable using signals from the controller 110. In the illustrated embodiment, control lines 322 and 324 transmit control signals for controlling switching of the switch 302 and the switch 314. For example, the control lines 322 and 324 may be configured as, embodied as or form part of the control line 104 (shown in FIG. 1) that transmit switch control signals from the controller 110 (shown in FIG. 1).

The reconfigurable front-end 300 also includes a filter 316 connected at an output end of the reconfigurable front-end 300. In the illustrated embodiment, the filter 316 is a band-pass filter that is configured is various embodiments to filter out signal harmonics. For example, the filter 316 is connected to an antenna 318, which may be configured as, embodied as or form part of the antenna 108 (illustrated in FIG. 1). In operation, the filter 316 filters signals before transmission and after reception. It should be noted that the filter 316 is configured to operate both during WiFi communications and RFID communications. In particular, the filter 316 is connected to a switching element 308c of the switch 302 that switches between communication paths for WiFi communications and RFID communications, respectively.

The switch 302 is switchable to an RFID communication mode by switching all of the switching elements 308 from the position (poles) illustrated in FIG. 3 to the other position (pole). In the illustrated embodiment, the RFID front-end section includes an isolator 320 configured as a circulator to isolate the transmission and reception paths for RFID communications. In particular, the transmission and return reception paths are isolated such that signals that are transmitted cannot return through the same path. Thus, the transmit signal is prevented from passing to the receive communication path. Similar to the WiFi communication mode of operation, the RFID front-end section is also connected to the filter 316.

Thus, using the reconfigurable front-end 300, the same radio and antenna may be using for different types of communication, illustrated as WiFi and RFID communications. In various embodiments, the RFID topology, having communication at a lower data rate than the WiFi topology, is essentially "piggybacked" onto the WiFi topology. In some embodiments, the WiFi and RFID communications are provided using a 915 MHz frequency. Thus, using reconfigurable communication paths and selectable front-end topologies, the same radio may be used for different communications that otherwise would have to be provided using different radios. For example, the various embodiments can be operated in different modes for use in different frequency bands. In some embodiments, the reconfigurable front-end has a reconfigurable architecture allowing WiFi 802.11ah and UHF RFID to share a common Tx/Rx radio chipset and a common antenna.

It should be appreciated that the herein disclosed subject matter can be generalized for different types of WiFi and Bluetooth architectures and result in specific front end embodiments, such as for any of the following cases:

1. When WiFi uses MIMO.
2. When RFID uses bistatic and multistatic configurations.
3. When both WiFi and RFID use the same frequency band that is different from 915 MHz (for example, 2.4 GHz).

With the herein disclosed configurations, the reconfigurable front-end does not require the use of additional components or separate radios. It should be noted that the various embodiments may be used in different applications with reconfigurable front-end controlled using appropriate commands or signals for the particular operating environment.

Figure 4:
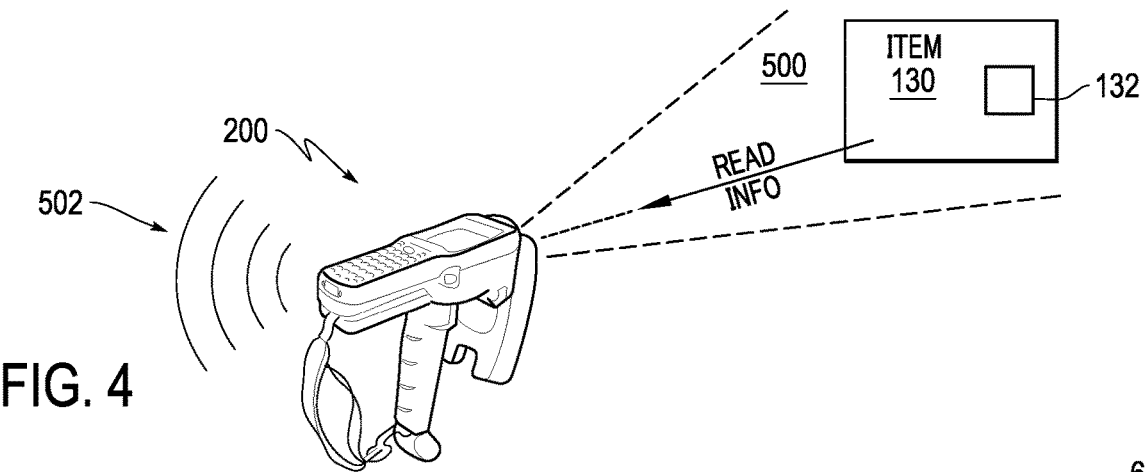
FIG. 4 depicts a scanning and communication operation according to one embodiment.

In various embodiments, the RFID apparatus 200 is moved in one or more directions to scan the region of interest 134 (shown in FIG. 1) to perform a read scan for RFID tags 132. For example, as illustrated in FIG. 4, a field of view 500 of the RFID apparatus 200 is scanned within the region of interest 134 to locate a particular item 130 using a reconfigurable antenna polarization or radiation pattern as described herein. In the illustrated embodiment, the RFID apparatus 200 is also switchable as described herein to provide WiFi communication 502, such as to communicate wirelessly with a network.

Thus, various embodiments provide a reconfigurable front-end arrangement that can be easily reconfigured with control signals to switch between an RFID communication mode and a WiFi communication mode. It should be noted that while the various embodiments are described in connection with particular operating characteristics, the various embodiments are not limited to the specific operating environment. Thus, one or more embodiments may be used in connection with different devices or in different applications.

Figure 5:
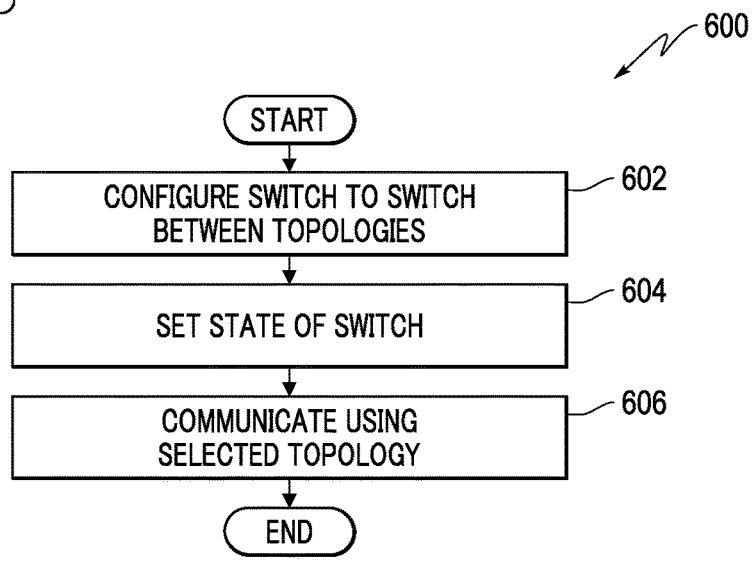
FIG. 5 is a flowchart of a method according to one or more embodiments.

A method 600 for providing a reconfigurable front-end is illustrated in FIG. 5. It should be appreciated that the method 600 may be implemented by one or more the embodiments disclosed herein, which may be combined or modified as desired or needed. Additionally, the steps in the method 600 may be modified, changed in order, performed differently, performed sequentially, concurrently or simultaneously, or otherwise modified as desired or needed.

The method 600 includes configuring a switching for switching between different front-end communication topologies. For example, as described herein, a switch is configured to switch between communication components that allow communication using WiFi communication or RFID communication.

Once the switch is set to a desired state at 604 (e.g., transmitting a control signal to select a WiFi front-end topology or an RFID front-end topology), the controller can communicate using the selected topology at 606. For example, in the RFID communication mode, communication with an RFID tag via the antenna may be provided. For example, the controller may send a control, read, interrogation, or other command signal or RFID signal via the antenna to communicate with an RFID tag. In response, the RFID tag may provide RFID data or other information. In the WiFi communication mode, wireless WiFi communication with, for example, a network may be provided.

Thus, various embodiments provide a switchable or reconfigurable front-end that can be implemented in a single radio using the same antenna.

It should be noted that one or more embodiments can comprise one or more microprocessors (which may be embodied as a processor) and a memory, coupled via a system bus. The microprocessor can be provided by a general purpose microprocessor or by a specialized microprocessor (e.g., an ASIC). In one embodiment, the system can comprise a single microprocessor which can be referred to as a central processing unit (CPU). In another embodiment, one or more configurations described herein can comprise two or more microprocessors, for example, a CPU providing some or most of the scanning functionality and a specialized microprocessor performing some specific functionality, such as to determine distance information and correlate that information with the acquired image information. A skilled artisan would appreciate the fact that other schemes of processing tasks distribution among two or more microprocessors are within the scope of this disclosure. The memory can comprise one or more types of memory, including but not limited to: random-access-memory (RAM), non-volatile RAM (NVRAM), etc.

It should be noted that, for example, the various embodiments can communicate between components using different standards and protocols. For example, the wireless communication can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiments were chosen and described in order to best explain the principles of embodiments and practical application, and to enable others of ordinary skill in the art to understand embodiments with various modifications as are suited to the particular use contemplated.

Furthermore, as will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described herein with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks and when implemented in one or more embodiments, results in a transforming or converting a general purpose computer/processor/hardware to a specialized computer/processor/hardware that improves the technological art.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A device comprising:
   an antenna;
   a reconfigurable front-end comprising:
      a first front-end communication section that uses the antenna to communicate via a Wifi communication; and
      a second front-end communication section that uses the antenna to communicate via ultra-high frequency (UHF) radio-frequency identification (RFID) communication;
   a first switch configured to select the first front-end communication section or the second front-end communication section, by altering a topology of the reconfigurable front-end based on a control signal, wherein a first topological configuration of the reconfigurable front-end is associated with the first front-end communication section and a second topological configuration of the reconfigurable front-end is associated with the second front-end communication section;
   a second switch used for transmit/receive (Tx/Rx) for a Wifi radio; and
   a controller configured to output data to the antenna using the Wifi communication, via a common transmit/receive circuitry, and control the second switch, when the first switch selects the first front-end communication section, and to output data to the antenna using the UHF RFID communication, via the common transmit/receive circuitry, when the first switch selects the second front-end communication section, wherein the common transmit/receive circuitry comprises a transmitter and a receiver each configured to, via the first switch, connect through the first front-end communication section of the reconfigurable front-end to the antenna or through the second front-end communication section of the reconfigurable front-end to the antenna to facilitate the Wifi communication or the UHF RFID communication, respectively, via the reconfigurable front-end, wherein the controller is coupled to both the common transmit/receive circuitry and the reconfigurable front-end.

2. The device of claim 1, wherein the second switch is changed on when the first switch has selected the first front-end communication section.

3. The device of claim 1, wherein the common transmit/receive circuitry is used by both of the first and second front-end communication sections but not at the same time.

4. The device of claim 1, wherein the second front-end communication section comprises an isolator connected to the antenna through the first switch.

5. The device of claim 1, wherein the first switch is a three to six switch selectable between first and second states corresponding to a communication method for the first front-end communication section and a communication method for the second front-end communication section.

6. The device of claim 1, further comprising a power amplifier connected to an input of the first switch.

7. The device of claim 1, further comprising a band-pass filter connected between the first switch and the antenna.

8. The device of claim 1, wherein the antenna comprises a single antenna common to both the first front-end communication section and the second front-end communication section.

9. The device of claim 1, wherein the first switch comprises an RF switch.

10. The device of claim 1, wherein the first front-end communication section is configured to communicate using an 802.11 ah communication protocol and the second front-end communication section is configured to communicate using a UHF RFID protocol.

11. A radio comprising:
   an antenna;
   a reconfigurable front-end;
   a single transmit and receive communication chipset configured to operate for WiFi communication and radio-frequency identification (RFID) communication, wherein the single transmit and receive communication chipset comprises a transmitter and a receiver switchable between connecting through a first topological configuration of the reconfigurable front-end to the antenna and connecting through a second topological configuration of the reconfigurable front-end to the antenna to facilitate the Wifi communication or the RFID communication, respectively, via the reconfigurable front-end, and wherein the single transmit and receive communication chipset is switchable between the WiFi communication and the RFID communication, wherein the single transmit and receive communication chipset comprises a first switch configured to select a first front-end communication section or a second front-end communication section of the reconfigurable front-end by altering a topology of the reconfigurable front-end, based on a control signal, to communicate using the antenna, wherein the first topological configuration of the reconfigurable front-end is associated with the WiFi communication and the second topological configuration of the reconfigurable front-end is associated with the RFID communication, wherein the single transmit and receive communication chipset comprises a second switch used for transmit/receive (Tx/Rx) for a Wifi radio; and
   a controller coupled to both the single transmit and receive communication chipset and the reconfigurable front-end.

12. The radio of claim 11, wherein the single transmit and receive communication chipset is configured to operate in an RFID reader.

13. The radio of claim 11, wherein the single transmit and receive communication chipset comprises reconfigurable communication paths that are dynamically reconfigured.

14. The radio of claim 11, wherein the single transmit and receive communication chipset defines switchable front-end topologies.

15. The radio of claim 14, wherein the switchable front-end topologies communicate using an 802.11 ah communication protocol and a UHF RFID protocol.

16. The radio of claim 11, wherein the single transmit and receive communication chipset comprises a WiFi switch and an isolator.

17. The radio of claim 11, wherein the antenna comprises a single antenna common to the WiFi communication and the RFID communication.

18. A method comprising:
   sending a control signal to a reconfigurable front-end of a radio via a communication line;
   switching a topology of the reconfigurable front-end, based on the control signal, to change between communication methods used to transmit and receive signals, the communication methods including WiFi communication and radio-frequency identification (RFID) communication, wherein a first topological configuration of the reconfigurable front-end is associated with the WiFi communication and a second topological configuration of the reconfigurable front-end is associated with the RFID communication; and sending, by a common transmit/receive circuitry, a signal to be transmitted via a common antenna used for the WiFi communication and the radio-frequency identification (RFID) communication, wherein the common transmit/receive circuitry comprises a transmitter and a receiver switchable between connecting through the first topological configuration of the reconfigurable front-end to the common antenna and connecting through the second topological configuration of the reconfigurable front-end to the common antenna to facilitate the Wifi communication or the RFID communication, respectively, via the reconfigurable front-end, wherein a controller is coupled to both the common transmit/receive circuitry and the reconfigurable front-end.

19. The method of claim 18, wherein the reconfigurable front-end comprises reconfigurable communication paths.

\* \* \* \* \*